(12) United States Patent
Honji et al.

(10) Patent No.: US 11,869,473 B2
(45) Date of Patent: Jan. 9, 2024

(54) HOLLOW STRUCTURE AND RESONANT SOUND REDUCING BODY

(71) Applicant: Yamaha Corporation, Hamamatsu (JP)

(72) Inventors: Yoshikazu Honji, Hamamatsu (JP); Azumi Yoshida, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 455 days.

(21) Appl. No.: 17/128,899

(22) Filed: Dec. 21, 2020

(65) Prior Publication Data

US 2021/0110807 A1    Apr. 15, 2021

Related U.S. Application Data

(63) Continuation of application No. PCT/JP2019/003368, filed on Jan. 31, 2019.

(51) Int. Cl.
*G10K 11/172* (2006.01)
*B60C 19/00* (2006.01)
*B60B 21/12* (2006.01)

(52) U.S. Cl.
CPC .......... *G10K 11/172* (2013.01); *B60C 19/002* (2013.01); *B60B 21/12* (2013.01)

(58) Field of Classification Search
CPC ...... B60B 21/12; B60C 19/002; G10K 11/172
See application file for complete search history.

(56) References Cited

U.S. PATENT DOCUMENTS 9,399,372 B2 * 7/2016 Kamiyama ............. B60B 21/12
11,230,142 B2 * 1/2022 Kamiyama ............ G10K 11/172
11,338,743 B2 * 5/2022 Nagatomi ................. B60R 13/08
11,554,730 B2 * 1/2023 Kamiyama ............. B60B 21/12
2009/0151836 A1   6/2009 Ikeda et al.
2019/0389400 A1 * 12/2019 Nagatomi ............. G10K 11/172
2020/0009905 A1 * 1/2020 Kamiyama ............. B60B 21/12
2020/0010029 A1 * 1/2020 Kamiyama .......... G10K 11/172
2020/0160823 A1 * 5/2020 Kamiyama ............. B60B 21/12
(Continued)

FOREIGN PATENT DOCUMENTS

EP    3974205 A1 * 3/2022 ............. B60B 21/12
JP    2005-205934 A   8/2005
JP    2008-030505 A   2/2008
(Continued)

OTHER PUBLICATIONS

Japanese-language Office Action issued in Japanese Application No. 2020-569271 dated Nov. 30, 2021 with English translation (12 pages).

(Continued)

*Primary Examiner* — Forrest M Phillips
(74) *Attorney, Agent, or Firm* — Crowell & Moring LLP

(57) ABSTRACT

A hollow structure has a hollow body with an annular first space and at least one resonator. In the resonator there is formed an elongated second space with a pair of openings at two ends thereof. Each of the pair of openings opens inwardly toward the interior of the first space. The ratio of the length of a centerline of the second space to the length of a centerline of the first space is within a range of from 0.45 to 0.55. The second space is disposed in a curve along a circumferential surface of the first space and is shaped such that one of the two ends of the second space is folded back toward the other end.

13 Claims, 9 Drawing Sheets

(56) References Cited

U.S. PATENT DOCUMENTS

2020/0397618 A1\* 12/2020 Hua ................. H04R 3/02

FOREIGN PATENT DOCUMENTS

| | | |
|---|---|---|
| JP | 2015-145181 A | 8/2015 |
| JP | 2015-171876 A | 10/2015 |
| JP | 2017-142310 A | 8/2017 |

OTHER PUBLICATIONS

International Search Report (PCT/ISA/210) issued in PCT Application No. PCT/JP2019/003368 dated Feb. 26, 2019 with English translation (four (4) pages).
Japanese-language Written Opinion (PCT/ISA/237) issued in PCT Application No. PCT/JP2019/003368 dated Feb. 26, 2019 (four (4) pages).
Extended European Search Report issued in European Application No. 19912396.9 dated Dec. 17, 2021 (11 pages).
English translation of document C2 (Japanese-language Written Opinion (PCT/ISA/237) filed on Dec. 21, 2020) issued in PCT Application No. PCT/JP2019/003368 dated Feb. 26, 2019 (six (6) pages).

\* cited by examiner

HOLLOW STRUCTURE AND RESONANT SOUND REDUCING BODY

CROSS-REFERENCE TO RELATED APPLICATION

This application is a Continuation Application of PCT Application No. PCT/JP2019/003368, filed Jan. 31, 2019, the entire contents of which are incorporated herein by reference.

BACKGROUND

Technical Field

The present disclosure relates to a hollow structure and a resonant sound reducing body.

Background Information

A hollow body in which there is formed an annular space is constituted of a tire and a rim assembly. An air column resonance generated inside an air chamber of the tire causes noise such as road noise in automobiles. To suppress such noise, some have disposed inside a tire air chamber a sub-chamber comprising Helmholtz resonators.

The above-referenced technique is subject to the following drawbacks "a" and "b" caused by use of Helmholtz resonators:

Drawback a: Helmholtz resonators have only a single resonant frequency. Consequently, an air column resonance can be reduced for only a fundamental frequency or for only one of its high-order frequencies, which results in an insufficient overall reduction in air column resonance; and Drawback b: the sub-chamber member is subject to deformation by centrifugal forces generated by tire rotation, etc., which may cause a change in resonant frequency of the Helmholtz resonator, and consequently a failure to achieve a reduction in air column resonance.

SUMMARY

In view of the foregoing problems, an object of the present disclosure is to sufficiently reduce an air column resonance inside a hollow body in which there is formed an annular space.

To solve the above-stated problems, a hollow structure according to an aspect of the present disclosure has a hollow body with an annular first space; and at least one resonator in which there is formed an elongated second space with a pair of openings at two ends thereof, each of the pair of openings comprising an opening that opens inwardly toward an interior of the first space, a ratio of a length of a centerline of the second space to a length of a centerline of the first space being within a range of from 0.45 to 0.55, and the second space is disposed in a curve along a circumferential surface of the first space and is shaped such that one of the two ends of the second space is folded back toward the other end.

A resonant sound reducing body according to an aspect of the present disclosure is a resonant sound reducing body that is disposed in a hollow body in which there is formed an annular first space, the resonant sound reducing body comprising an elongated second space with a pair of openings at two ends thereof. The ratio of a distance between the pair of openings to a length of a centerline of the second space is within a range of from 0.45 to 0.55, and the second space is disposed in a curve along a circumferential surface of the first space and is shaped such that one of the two ends of the second space is folded back toward the other end.

BRIEF DESCRIPTION OF THE DRAWINGS

The objects, features, advantages, and technical and industrial significance of the present disclosure will be better understood by reading the following detailed description of embodiments, when considered in connection with the accompanying drawings, in which.

DETAILED DESCRIPTION

Figure 1:
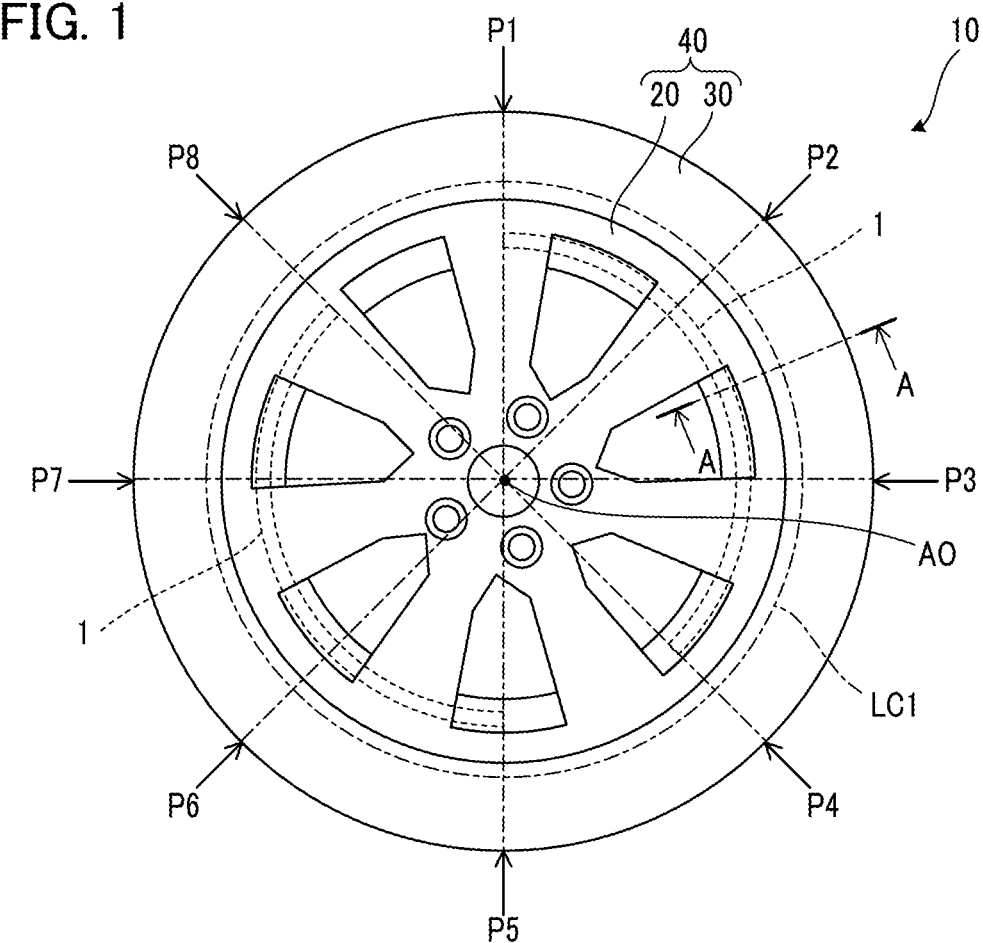
FIG. 1 is a side view of an inventive hollow structure.

An embodiment of the present disclosure will now be described with reference to the drawings. It is of note that a size and scale of each element in the drawings may not be the same as those of actual elements. Further, in the following embodiments preferred specific examples of the present disclosure are described, and these examples include preferable technical limitations. Notwithstanding, the scope of the present disclosure is not limited to the examples described unless specific statement to the contrary is made.

1-1. Configuration of Hollow Structure

Figure 2:
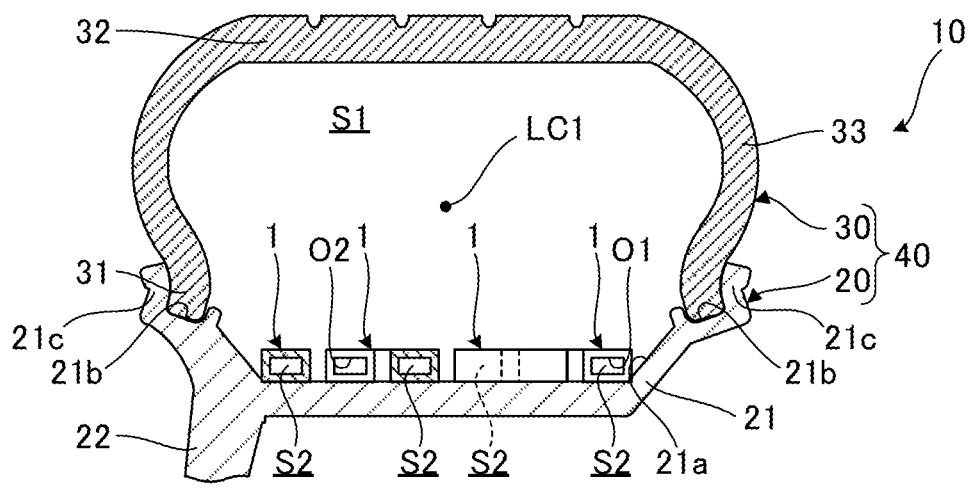
FIG. 2 is a cross-sectional view taken along line A-A referenced in FIG. 1.

FIG. 1 is a side view of a hollow structure 10. FIG. 2 is a cross-sectional view taken along line A-A referenced in FIG. 1. The hollow structure 10 depicted in FIGS. 1 and 2 is a vehicle wheel structure for automobiles. As shown in FIGS. 1 and 2, the hollow structure 10 includes a wheel 20, a tire 30, and a plurality of resonators 1. The wheel 20 and the tire 30 constitute a hollow body 40 in which there is formed an annular first space S1. The resonators 1 each comprises a resonant sound reducing body to reduce an air column resonance of the first space S1. The resonators 1 each has an elongated second space S2 with a pair of openings O1 and O2 at two ends thereof, each of the pair of the openings comprising an opening that opens inwardly toward the interior of the first space S1, as will be described in detail later. In the following, each part of the hollow structure 10 will be described in turn.

The wheel 20 is for use in a vehicle such as an automobile. The wheel 20 according to the present embodiment may be structured in the same way as a known vehicle wheel. As shown in FIG. 2, the wheel 20 has a rim 21 and a disk 22. The rim 21 is an annular wheel rim. There are provided on the outer circumferential surface of the rim 21 a wheel well part 21a and a pair of bead seat parts 21b along a circumferential direction of the rim 21. The wheel well part 21a is concave and extends in the circumferential direction of the rim 21. The pair of bead seat parts 21b is used for fixedly fitting the tire 30. There are also provided at each side of the rim 21 in a widthwise direction a pair of rim flanges parts 21c, with each of the rim flange parts 21c sandwiching a corresponding bead seat part 21b. The pair of the rim flange parts 21c protrudes outward in the radial direction of the rim 21. The disk 22 is attached to the rim 21 at an inner side thereof and has a portion mounted to an axle hub (not shown) of the vehicle. FIG. 2 illustratively depicts a case in which the disk 22 is formed integral with the rim 21. It is of note that the disk 22 may be formed separate from the rim 21, in which case the rim 21 and the disk 22 are attached to each other by use of bolts or the like.

The rim 21 and the disk 22 may be made of an aluminum alloy, a magnesium alloy, an iron, and so forth. In a case that the disk 22 is formed separate from the rim 21, the rim 21 and the disk 22 may be made of different materials. It is of note that although FIG. 2 illustrates a configuration in which the rim 21 is constituted of a single member, the rim 21 may be constituted of multiple members. In this case, the multiple members that constitute the rim 21 may be made of different materials.

The tire 30 is assembled together with a wheel 20, and an annular first space S1 is formed between the tire 30 and the wheel 20. The tire 30 according to the present embodiment is structured in the same way as a known tire used, for example, in an automobile. As shown in FIG. 2, the tire 30 has a pair of bead parts 31, a tread part 32, and a pair of sidewall parts 33. The pair of bead parts 31 fits with the pair of bead seat parts 21b. The tread part 32 comes into contact with a road surface. The pair of sidewall parts 33 connects the pair of bead parts 31 and the tread part 32. The tire 30 is mainly made from rubber materials. Although not shown, the tire 30 also has known portions such a bead, belt, and carcass made from metallic materials or fiber materials in addition to portions made from the rubber materials.

As shown in FIG. 2, a plurality of resonators 1 is disposed inside the first space S1. By this configuration, each of the pair of openings O1 and O2 comprises an opening that opens inwardly toward the interior of the first space S1, the pair of the openings O1 and O2 corresponding to the two ends of the second space S2 each of the resonators 1. The resonators 1 according to the present embodiment are positioned on the outer circumferential surface of the rim 21. Although not shown in the figures, the resonators 1 are attached to the rim 21 by use of an adhesive, screws, a binder, or the like.

Figure 3:
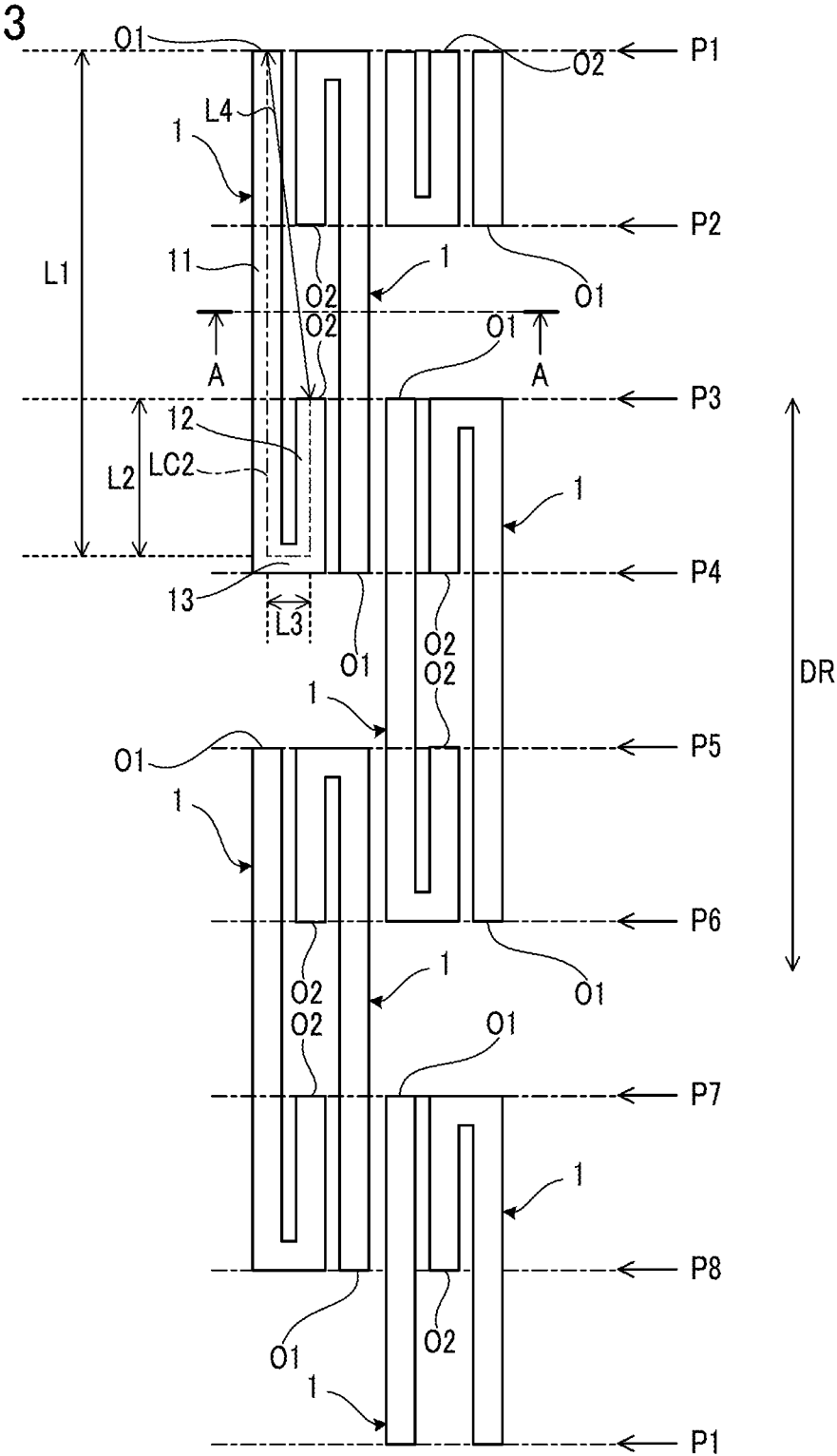
FIG. 3 is an exploded planar view depicting an arrangement of an inventive resonant sound reducing body.
Figure 4:
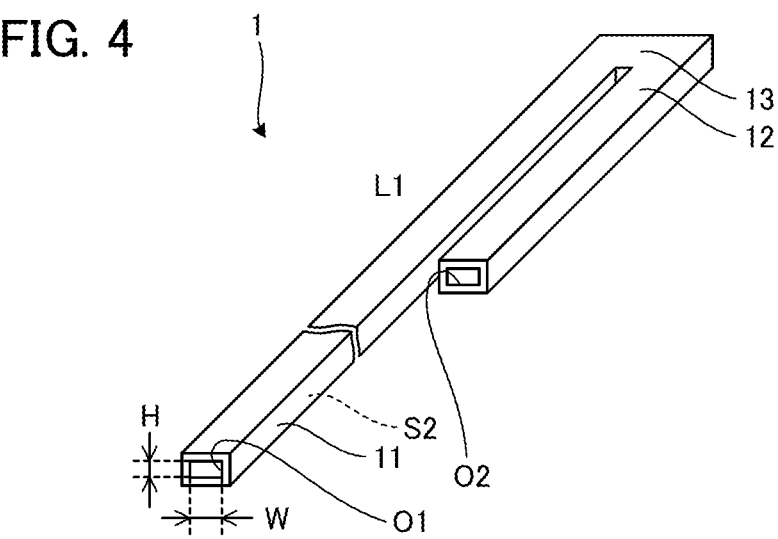
FIG. 4 is a perspective view of the inventive resonant sound reducing body.

FIG. 3 is an exploded planar view depicting an arrangement of the resonators 1, each of which comprises a resonance sound reducing body according to the present embodiment. FIG. 4 is a perspective view of a resonator 1. As shown in FIG. 3, according to the present embodiment eight resonators 1 are disposed in the hollow body 40. Two resonators each of the eight resonators 1 provide a pair, and thus from the eight resonators 1 a total of four pairs is provided. Each of the four pairs of the eight resonators 1 is disposed at a different position in the circumferential direction DR of the first space S1. Two resonators 1 constituting a pair are disposed in differing directions from each other. In the present embodiment, an opening O1 each of the eight resonators 1 is displaced from another opening O1 by 45 degrees in the circumferential direction DR of the first space S1. Likewise, an opening O2 each of the eight resonators 1 is displaced from another opening O2 by 45 degrees in the circumferential direction DR of the first space S1. FIG. 3 shows positions P1, P2, P3, P4, P5, P6, P7 and P8 at 45 degree intervals in the circumferential direction DR of the first space S1. For convenience of explanation, in FIG. 3 the scale in the circumferential direction DR of the first space S1 is different from that in FIG. 1. It is of note that the number of the resonators 1 is not limited to eight, and may be one or more, and 7 or less, or 9 or more.

As shown in FIG. 4, the resonator 1 is a tube in which a second space S2 is formed. The resonator 1 can be readily manufactured using a suitable available tube. One end of the resonator 1 is provided with an opening O1, and the other end with an opening O2. The opening O1 and the opening O2 communicate with each other via the second space S2. In the present embodiment, the shape of the lateral cross section of the second space S2 is quadrangular. Accordingly, an advantage is obtained in that it is possible to make the lateral cross-sectional area of the second space S2 larger as compared with a case in which the shape of the lateral cross section of the second space S2 is round. The width W and height H of the second space S2 remain unchanged throughout the longitudinal direction of the second space S2. It is of note that the second space S2 may have portions with a different width W and/or height H depending on a longitudinal position of the second space S2. The shape of the lateral cross section of the second space S2 is not limited to a quadrangle, and may be round, or a polygon other than a quadrangle, and so forth.

The resonator 1 according to the present embodiment is shaped such that one end thereof is folded back toward the other end thereof. More specifically, the resonator 1 has two portions 11 and 12 that extend in parallel to each other and a portion 13 that connects the two portions. The portions 11 and 12 are disposed in a curve along the circumferential direction DR of the first space S1. The length L1 of the portion 11 is longer than the length L2 of the portion 12. The portion 13 extends in a direction perpendicular to the direction of extension of the portions 11 or 12 and connects an end each of the portion 11 and the portion 12. The length L3 of the portion 13 is shorter than the length L2 of the portion 12. In FIGS. 3 and 4, the portions 11, 12, and 13 are formed integral. The portions 11, 12 and 13 may be made of a resin, an elastomer, a metal, or other appropriate materials, although not limited thereto. The portions 11, 12, and 13 may be formed separate from each other, in which case, each portion may be made of a different material. FIGS. 3 and 4 show a form in which the resonator 1 or the second space S2 has two bent portions, but the present disclosure is not limited thereto. The resonator 1 or the second space S2 may be shaped in such a way as to have one or more curved portions.

The ratio of the length of the centerline LC2 of the second space S2 to that of the centerline LC1 of the first space S1 is 0.5 or within a range approximate thereto. Specifically, the range is from 0.45 to 0.55, inclusive, and preferably from 0.48 to 0.52, inclusive. With the ratio within the above range, it is possible to attain the effect of reducing an air column resonance in the first space S1. In the following, such an effect will be also referred to as "resonance reduction effect."

The centerline LC1 is a line drawn for a set of geometric centers of gravity in any and all cross sections of the first space S1. The cross section of the first space S1 is a cross section along a plane that includes an axial line AO, which is the center axis of the first space S1. The centerline LC2 is a line drawn for a set of geometric centers of gravity in any and all cross sections of the second space S2. The cross section of the second space S2 is a cross section perpendicular to the length direction of the second space S2.

The two ends of the second space S2 of the resonator 1 comprise a pair of the openings O1 and O2, and accordingly, the resonator 1 functions as a double open-sided tube. Therefore, it is possible to reduce an air column resonance of a fundamental frequency and high-order frequencies generated in the first space S1. The fundamental frequency is a first order resonant frequency of the first space S1. The high-order frequencies are integer multiples of the first order resonant frequency of the first space S1. It is of note that a single open-sided tube resonator can also reduce an air column resonance of high-order frequencies, but such high-order frequencies are limited to odd multiples of a first-order resonance frequency.

The pair of the openings O1 and O2 are displaced from each other in the circumferential direction DR of the first space S1. By this arrangement, the resonance reduction effect is enhanced. FIG. 3 shows a configuration in which the pair of the openings O1 and O2 are displaced from each other by 90 degrees in the circumferential direction DR of the first space S1. It suffices if the pair of the openings O1 and O2 are displaced from each other in the circumferential direction DR, and the present disclosure is not limited to the example shown in FIG. 3. The pair of the openings O1 and O2 are preferably displaced at an angle within a range of from between 45 to 135 degrees (inclusive) in the circumferential direction DR, and more preferably, at an angle within a range of from between 80 to 100 degrees (inclusive), and even more preferably, at an angle within a range of from between 85 to 95 degrees (inclusive) in the circumferential direction DR. As a result of the pair of the openings O1 and O2 being displaced at an angle within any one of the above ranges, when an acoustic pressure of one of the pair of the openings O1 and O2 is high, an acoustic pressure of the other is low. Therefore, the previously described resonance reduction effect is greater as compared with a case in which the pair of the openings O1 and O2 are arranged in a different manner. It is of note that in the present embodiment the first space S1 is annular in shape with the axial line AO as the center axis, in which case, the "angle in the circumferential direction DR" is equal to an angle defined by a line segment between the center of the opening O1 and the axial line AO, and a line segment between the center of the opening O2 and the axial line AO.

Further, the ratio of the distance L4 between the pair of the openings O1 and O2 to the length of the centerline LC2 of the second space S2 is within a range of from 0.45 to 0.55 (inclusive). The distance L4 is a distance between the center of the opening O1 and that of the opening O2 in a state in which no external force is applied to the resonator 1, namely, where the resonator 1 is not installed on the hollow body 40. By configuring the ratio of the distance L4 to the length of the centerline LC2 to fall within the range of from 0.45 to 0.55, the pair of the openings O1 and O2 can be displaced from each other at an angle within a range of from between 80 to 100 degrees (inclusive) in the circumferential direction DR when the length of the centerline LC2 in the second space S2 is configured to be within the previously described range (i.e., when the length of the centerline LC2 is configured such that the ratio of the length of the centerline LC2 to that of the centerline LC1 is 0.5 or within a range approximate thereto). The openings O1 and O2 are arranged in lines along the circumferential direction DR. The length of the centerline LC2 in the second space S2 is generally equal to the sum total length of the above described lengths L1, L2 and L3. Further, in FIG. 3, the portions 11 and 12 of the resonator 1 are arranged in parallel to the circumferential direction DR. However, if the pair of the openings O1 and O2 are displaced from each other at an angle within the above range, the portions 11 and 12 of the resonator 1 may be inclined with respect to the circumferential direction DR.

1-2. Action of Resonant Sound Reducing Body

Since the resonant frequency of the first space S1 and the resonant frequency of the second space S2 have a predetermined relationship, the resonator 1 reduces an air column resonance of the first space S1 under the same principle as that of vibration damping by the dynamic vibration absorber. In the following, the action of the resonator 1 will be described.

Figure 5:
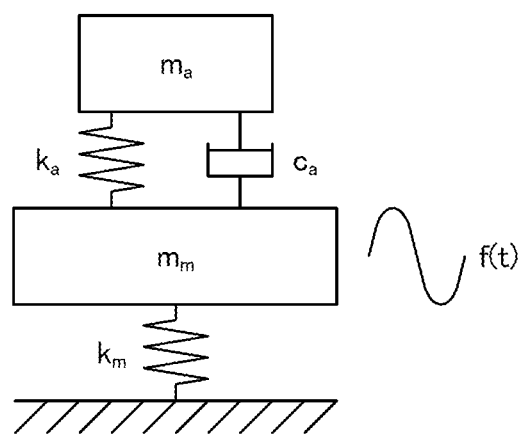
FIG. 5 is a diagram explaining the principle of vibration damping by a dynamic vibration absorber.

FIG. 5 is a diagram explaining the principle of vibration damping by a dynamic vibration absorber. There is shown in FIG. 5 a model that includes a main vibration system consisting of a spring $k_m$ and a mass $m_m$ and a sub vibration system attached to the main vibration system, wherein the sub vibration system consists of a spring $k_a$, an attenuator $c_a$, and a mass $m_a$. In this model, the main vibration system is subject to the exciting force f (t), and the sub vibration system functions as a dynamic vibration absorber that reduces vibration of the main vibration system. The function of the sub vibration system is realized when the natural angular frequency thereof matches or is close to the frequency of the exciting force f (t).

The frequency of the exciting force f (t) corresponds to the resonant frequency of the first space S1 of the hollow body 40. Further, the natural angular frequency of the sub vibration system corresponds to the resonant frequency of the second space S2 of the resonator 1. By configuring the ratio of the length of the centerline LC2 in the second space S2 to the length of the centerline LC1 in the first space S1 to be approximately 0.5, the resonant frequency of the second space S2 matches or approaches the resonant frequency of the first space S1. As a result, the resonance reduction effect is achieved. The resonant frequency of the second space S2 in the resonator 1 is dependent on the length of the centerline LC2 in the second space S2. The resonant frequency of the resonator 1 is thus unlikely to vary even if the resonator 1 is deformed under centrifugal force, or the like, and thus the resonance reduction effect can be advantageously maintained.

Figure 6:
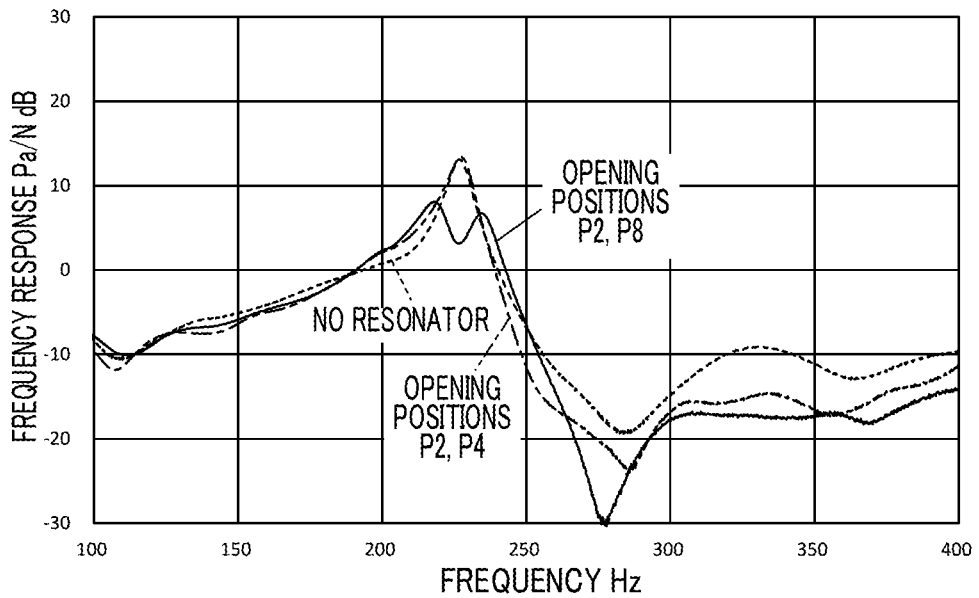
FIG. 6 is a graph showing relations between a frequency of resonant sound and a frequency response in the first space for different positions of the resonators.
Figure 7:
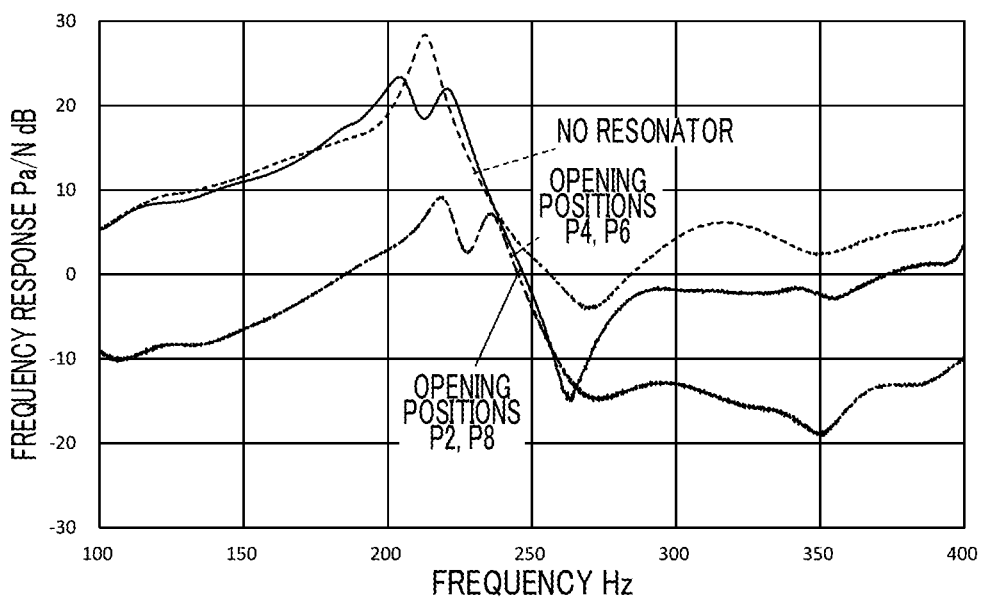
FIG. 7 is a graph showing relations between a frequency of resonant sound and a frequency response in the first space for different positions of the resonators.

FIGS. 6 and 7 are each graphs showing relations between a frequency of resonant sound and a frequency response in the first space S1 for different positions of the resonators 1. The results shown in FIGS. 6 and 7 are obtained by applying an exciting force to the tire 30 at the position P1 and measuring an acoustic pressure produced in the tire 30 at the position P1. In FIG. 6, a case in which the resonator 1 is not provided is depicted by the dashed line; a case in which the positions of the pair of openings the O1 and O2 are respective positions P2 and P4 is depicted by the dot dashed line; and a case in which the positions of the pair of the openings O1 and O2 are respective positions P2 and P8 is depicted by the solid line. In FIG. 7, a case in which the resonator 1 is not provided is depicted by the dashed line; a case in which the positions of the pair of the openings O1 and O2 are respective positions P4 and P6 is depicted by the dot dashed line; and a case in which the positions of the pair of the openings O1 and O2 are respective positions P2 and P8 is depicted by the solid line. From the results shown in FIGS. 6 and 7, it can be seen that the resonance reduction effect is highest when the resonator 1 is disposed either closest to or farthest away from the excitation position P1, which is the position at which excitation is applied. It can also be seen that the resonance reduction effect varies depending on a relationship between the excitation position and a position of the resonator 1. It is of note that the lower the peak of the frequency response, the higher the resonance reduction effect.

Figure 8:
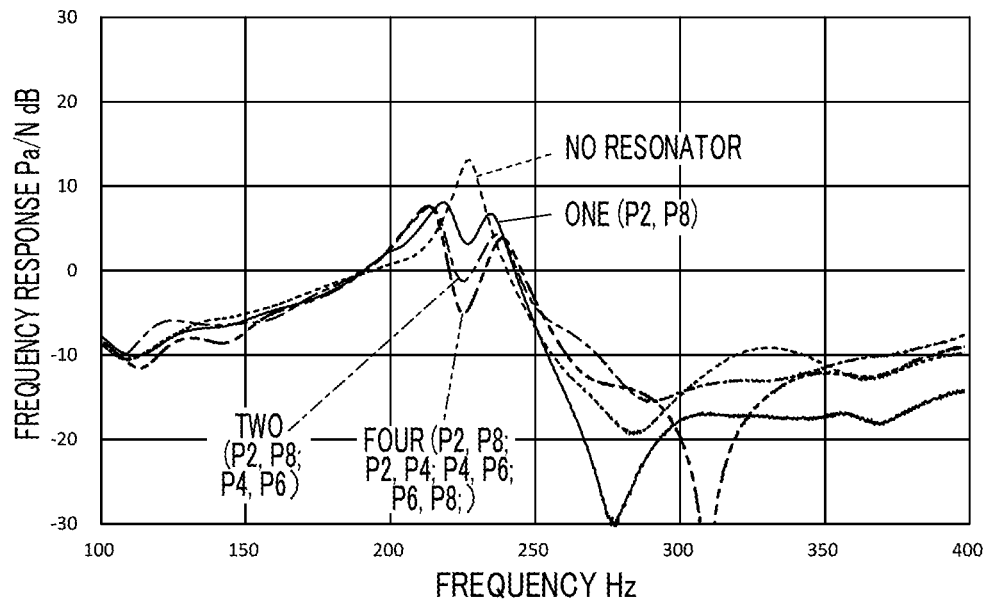
FIG. 8 is a graph showing relations between a frequency of resonant sound and a frequency response in the first space for different numbers of the resonators.

FIG. 8 is a graph showing relations between a frequency of resonant sound and a frequency response in the first space for different numbers of the resonators 1. Similarly to the results shown in FIGS. 6 and 7, the results shown in FIG. 8 are obtained by applying an exciting force to the tire 30 at the position P1 and measuring an acoustic pressure produced in the tire 30 at the position P1. In FIG. 8, a case in which the resonator 1 is not provided is depicted by the dashed line; a case in which one resonator 1 is provided is depicted by the solid line; a case in which two resonators 1 are provided is depicted by the dot dashed line; and a case in which four resonators 1 are provided is depicted by the dot-dot dashed line. In the case depicted by the solid line in FIG. 8, the pair of the openings O1 and O2 are located at the respective positions P2 and P8. In the case depicted by the dot dashed line in FIG. 8, the pair of the openings O1 and O2 of one of the two resonators 1 are located at the respective positions P2 and P8, and the pair of the openings O1 and O2 of the other resonator 1 are located at the respective positions P4 and P6. In the case depicted by the dot-dot dashed line in FIG. 8, the pair of the openings O1 and O2 of one of the four resonators 1 are located at the respective positions P2 and P8; for another resonator 1 at the respective positions P4 and P6; for yet another resonator 1 at the respective positions P2 and P4; and for the other resonator 1 at the respective positions P6 and P8. It can be seen from the results shown in FIG. 8 that the greater the number of the resonators 1, the greater the resonance reduction effect.

As will be apparent from the results shown in FIG. 8, the resonance reduction effect can be increased in the hollow body 10 as a result of employing multiple resonators 1, as compared with a case of employing a single resonator 1. Further, since the multiple resonators 1 are disposed at a different position in the circumferential direction DR of the first space S1, variations in the resonance reduction effect can be reduced even if a direction of excitation exerted on the hollow body 40 changes. In particular, since the number of the resonators 1 is four or more, an advantage is obtained in that the variation in the resonance reduction effect can be easily reduced even if the direction of the excitation exerted on the hollow body 40 changes.

Figure 9:
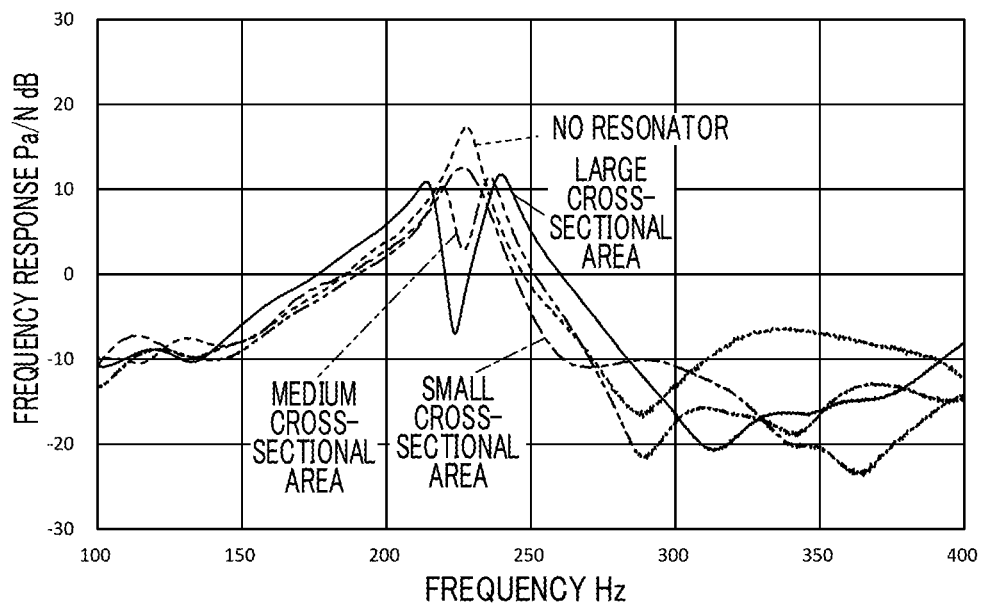
FIG. 9 is a graph showing relations between a frequency of resonant sound and a frequency response in the first space for different diameters (cross-sectional areas) of a second space.

FIG. 9 is a graph showing relations between a frequency of resonant sound and a frequency response in the first space for different thicknesses (cross-sectional areas) of the second space S2. Similarly to the results shown in FIGS. 6, 7, and 8, the results shown in FIG. 9 are obtained by applying an exciting force to the tire 30 at the position P1 and measuring an acoustic pressure produced in the tire 30 at the position P1. In FIG. 9, a case in which the resonator 1 is not provided is depicted by the dashed line; a case in which the lateral cross-sectional area of the second space S2 is 470 mm$^2$ is depicted by the solid line; a case in which the lateral cross-sectional area of the second space S2 is 27 mm$^2$ is depicted by the dot dashed line, and a case in which the lateral cross-sectional area of the second space S2 is 170 mm$^2$ is depicted by the dot-dot dashed line. In all cases, the pair of the openings O1 and O2 are located at the respective positions P2 and P8. From the results shown in FIG. 9, it can be seen that the larger the lateral cross-sectional area of the second space S2 is, the greater the resonance reduction effect.

Upon further analysis separate from the results shown in FIG. 9, the lateral cross-sectional area of the second space S2 is preferably within a range of from between 25 mm$^2$ to 1200 mm$^2$ With the lateral cross-sectional area being within this range, for example, when the hollow structure 10 is an assembly of an automotive vehicle tire 30 and a wheel 20, as in the present embodiment, or a structure having a first space S1 of the same size, it is easy to achieve both the effect of reducing an air column resonance in the first space S1 and the ready installation of the resonator 1 in the first space S1.

Another embodiment of the present disclosure will now be described. For elements having actions or functions identical to those of the previous embodiment in the embodiment illustrated in the following, the same reference signs as those in the descriptions of the previous embodiment are used and detailed explanation of such elements is omitted, as appropriate.

Figure 10:
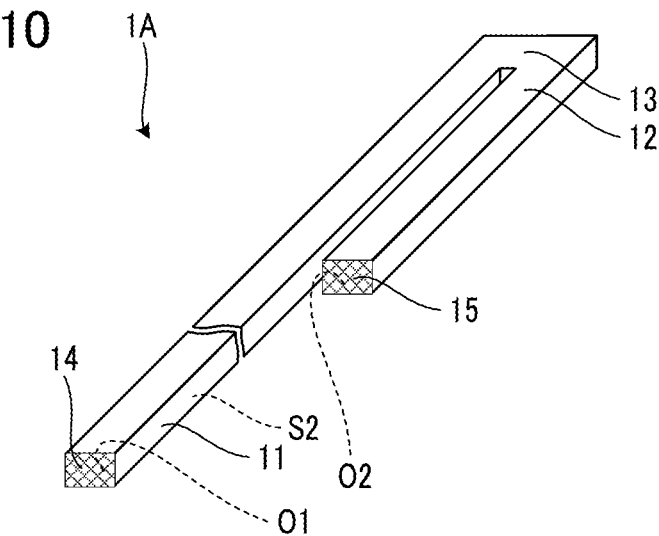
FIG. 10 is a perspective view of another resonant sound reducing body.

FIG. 10 is a perspective view of a resonator 1A, which is a resonant sound reducing body according to the present embodiment. As shown in FIG. 10, the resonator 1A is substantially the same as the resonator 1 of the previous embodiment with the exception that the resonator 1A has a porous body 14 disposed in the opening O1 thereof, and a porous body 15 disposed in the opening O2 thereof. Each of the porous bodies 14 and 15 is air permeable. By disposing the porous bodies 14 and 15 in the pair of the openings O1 and O2, it is possible to effectively adjust the degree of a reduction effect of an air column resonance in the first space S1. FIG. 10 illustrates a case in which each of the porous bodies 14 and 15 is made of a nonwoven fabric. The porous bodies 14 and 15 can be easily manufactured by use of a suitable existing nonwoven fabric because each of the porous bodies 14 and 15 is made of a nonwoven fabric.

Figure 11:
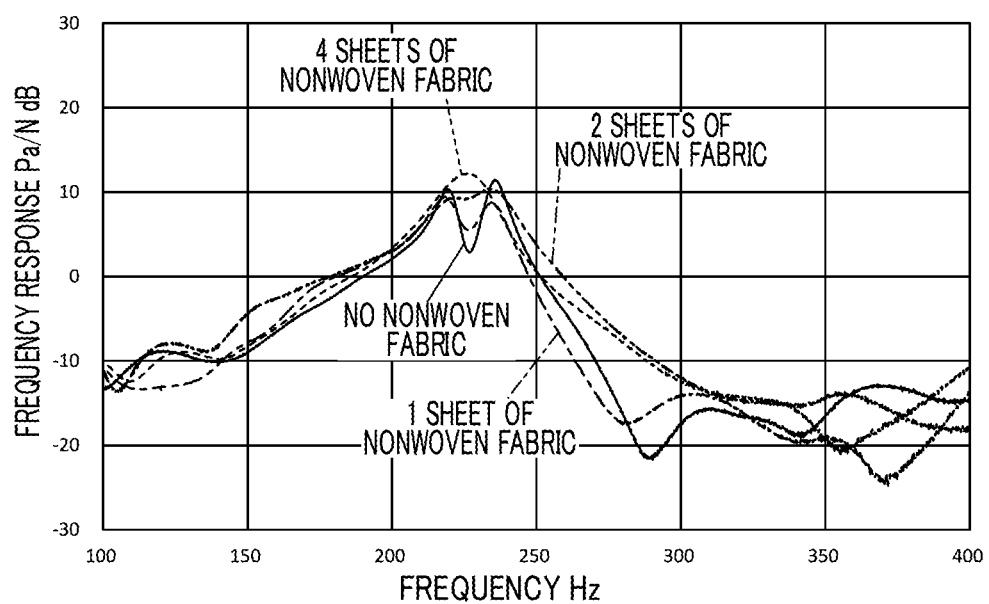
FIG. 11 is a graph showing relations between a frequency of resonant sound and a frequency response in the first space for different thicknesses (number of sheets) of a nonwoven fabric.

FIG. 11 is a graph showing relations between a frequency of a resonant sound and a frequency response in the first space S1 for different thicknesses (different numbers of sheets) of the nonwoven fabric constituting each of the porous bodies 14 and 15. The results shown in FIG. 11 are obtained by applying an excitation force to the tire 30 at the position P1 and measuring a sound pressure produced by the tire 30 at the position P1, similarly to the results shown in FIGS. 6 and 7, and so forth. In FIG. 11, a case in which no nonwoven fabric is provided is depicted by the solid line; a case in which one sheet of nonwoven fabric is provided is depicted by the dot dashed line; a case in which two sheets of the nonwoven fabric are provided is depicted by the dot-dot dashed line; and a case in which four sheets of the nonwoven fabric are provided is depicted by the dashed line. In all cases, the pair of the openings O1 and O2 are located at the respective positions P2 and P8. From the results shown in FIG. 11, it can be seen that use of the nonwoven fabric with an appropriate thickness increases the resonance reduction effect. In other words, by setting to an adequate degree air permeability of the porous bodies 14 and 15, the resonance reduction effect can be enhanced as compared to a case in which the porous bodies 14 and 15 are not provided.

Each of the porous bodies 14 and 15 need only be a porous body that is air permeable, and such a body is not limited to the nonwoven fabric, and may be, for example, a member having a plate-like portion in which a plurality of through-holes are formed. By employing such a member, an advantage is obtained in that an air permeability of the porous bodies 14 and 15 is unlikely to be adversely affected, even if dirt and the like adhere to the porous bodies 14 and 15 upon use.

Another embodiment of the present disclosure will now be described. For elements having actions or functions identical to those of the previous embodiment in the embodiment illustrated in the following, the same reference signs as those in the descriptions of the previous embodiment are used and detailed explanation of such elements is omitted, as appropriate.

Figure 12:
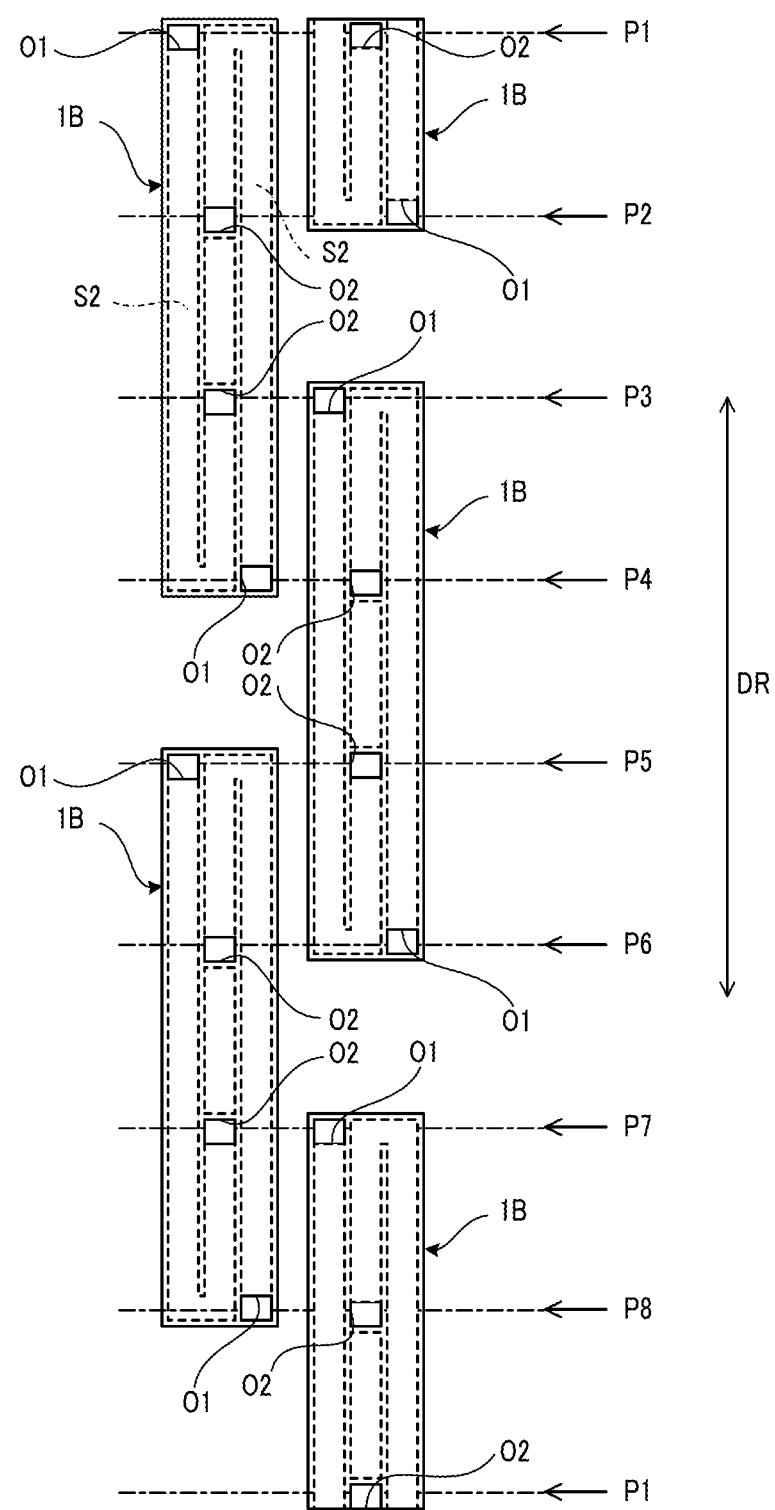
FIG. 12 is an exploded view showing an arrangement of another resonant sound reducing body.
Figure 13:
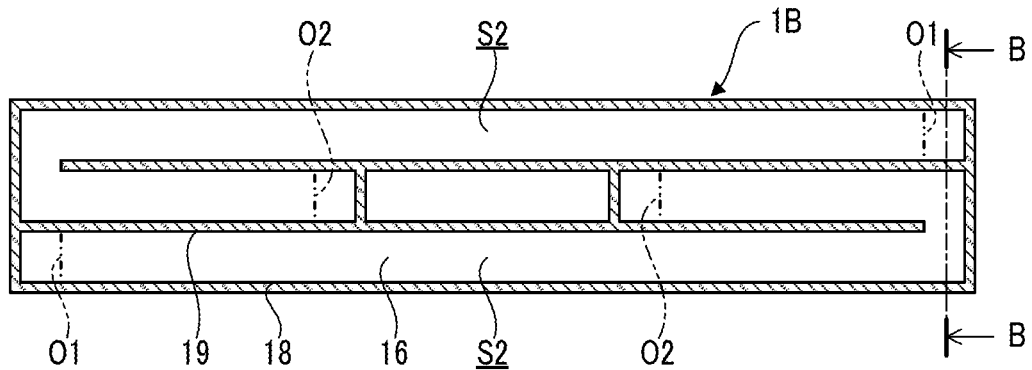
FIG. 13 is a cross-sectional view of another resonant sound reducing body.
Figure 14:
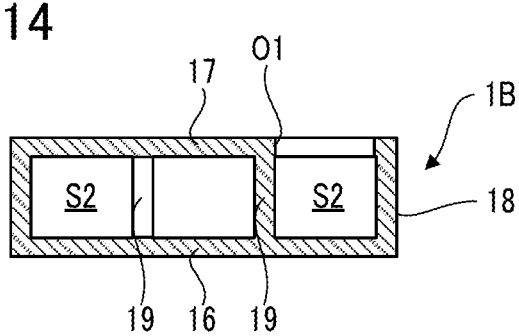
FIG. 14 is a cross-sectional view taken along line B-B referenced in FIG. 13.

FIG. 12 is an exploded view of the arrangement of the resonator 1B, which is a resonant sound reduction body according to the present embodiment. FIG. 13 is a cross-sectional view of the resonator 1B. FIG. 14 is a cross-sectional view taken along line B-B referenced in FIG. 13. As shown in FIG. 12, the outer shape of the resonator 1B is plate-shaped. Inside the resonator 1B there are formed a pair of second spaces S2 that are arranged in differing directions to each other. In the present embodiment, the pair of the openings O1 and O2 comprise the ends of each second space S2, and are open at one of the two surfaces of the resonator 1B. As shown in FIGS. 13 and 14, the resonator 1B has a lower plate 16, an upper plate 17, sidewalls 18, and partitions 19. The lower plate 16 and the upper plate 17 are arranged parallel to each other. Two pairs of the openings O1 and O2 are provided in the upper plate 17. The sidewalls 18 connect the outer periphery of the lower plate 16 and the upper plate 17 to each other over the entire circumference of the lower plate 16 and the upper plate 17. The partitions 19 divide a space surrounded by the lower plate 16, the upper plate 17, and the sidewalls 18 to form a pair of second spaces S2. The resonator 1B has an advantage over the resonator 1 or 1A of the above described embodiments in that it is easier to install the resonator 1B in the hollow body 40 as compared to the resonator 1 or 1A.

The present disclosure is not limited to the above embodiments, and may be modified in a variety of ways as described below. Two or more modes of the above embodiments and the modifications may be combined, as appropriate.

Figure 15:
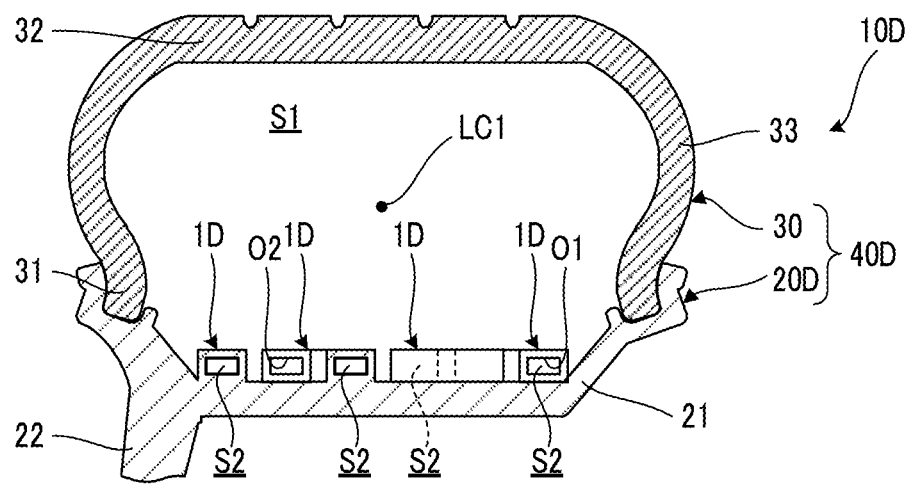
FIG. 15 is a cross-sectional view of another hollow structure.

FIG. 15 is a cross-sectional view of another hollow structure 10D. The hollow structure 10D shown in FIG. 15 is substantially the same as the hollow structure 10 of the previous embodiment, except that the resonator 1D is formed to be integral with the wheel 20D. That is, the hollow structure 10D has a wheel 20D, a tire 30 and a plurality of resonators 1D. The wheel 20D and the tire 30 comprise a hollow body 40D in which there is formed an annular first space S1. The plurality of resonators 1D are formed to be integral with the wheel 20D. A second space S2 is formed in each of the plurality of resonators 1D, as in the above-described resonator 1. FIG. 15 shows a configuration in which the plurality of the resonators 1D are disposed on the rim 21 of the wheel 20D. It is of note that the configuration is not limited to the above configuration so long as the pair of the openings O1 and O2 are located within the first space S1. For example, some or all of the plurality of the resonators 1D may be disposed in the disc 22.

Figure 16:
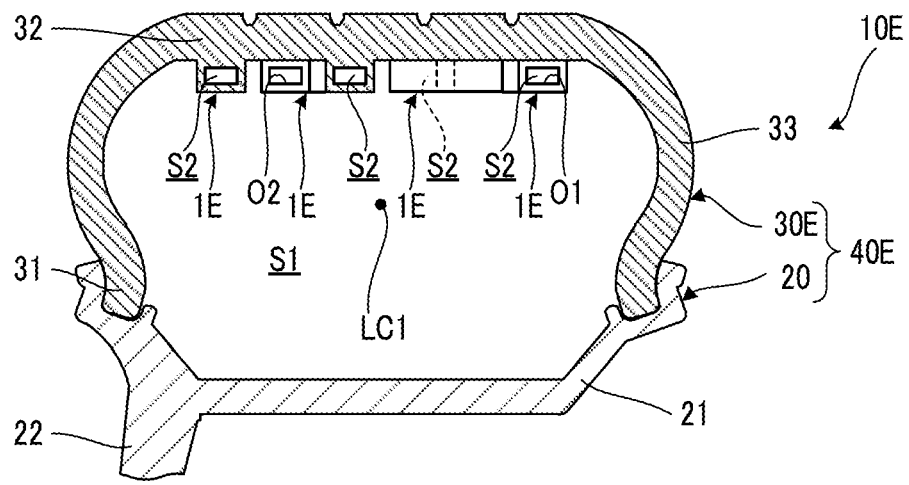
FIG. 16 is a cross-sectional view of another hollow structure.

FIG. 16 is a cross-sectional view of another hollow structure 10E. The hollow structure 10E shown in FIG. 16 is substantially the same as the hollow structure 10 of the previous embodiment described above, with the exception that the resonator 1E is formed integral with the tire 30E. That is, the hollow structure 10E includes a wheel 20, a tire 30E, and a plurality of resonators 1E. The wheel 20 and the tire 30E comprise a hollow body 40E in which there is formed an annular first space S1. The plurality of the resonators 1E are formed integral with the tire 30E. As in the above-described resonator 1, a second space S2 is formed in each of the plurality of the resonators 1E. FIG. 16 shows a configuration in which the plurality of the resonators 1E are disposed in the tread part 32 of the tire 30E. The configuration is not limited to the above configuration. For example, some or all of the plurality of resonators 1E may be disposed in the sidewall part 33.

Figure 17:
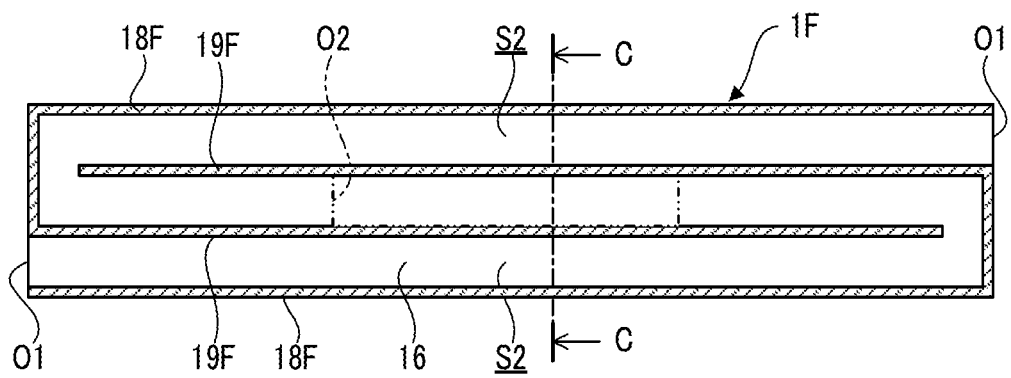
FIG. 17 is a cross-sectional view of another resonant sound reducing body.
Figure 18:
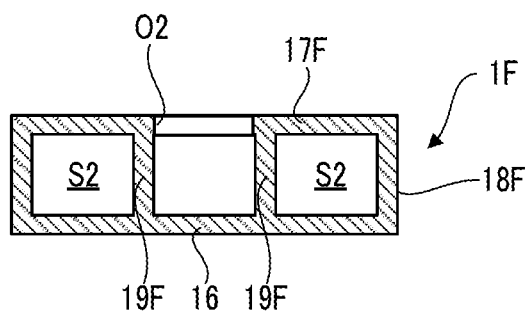
FIG. 18 is a cross-sectional view taken along Line C-C referenced in FIG. 17.

FIG. 17 is a cross-sectional view of a resonator 1F, which is a resonant sound reducing body. FIG. 18 is a cross-sectional view taken along line C-C referenced in FIG. 17. The resonator 1F shown in FIGS. 17 and 18 is substantially the same as the resonator 1B of the previous embodiment, with the exception that the orientation of the opening O1 and the size of the opening O2 differ. Specifically, the outer shape of the resonator 1F is plate-shaped. Inside the resonator 1F there are formed a pair of second spaces S2 arranged in differing directions. In the present modification, each opening O1 opens sideways on a side of the resonator 1F. The opening O2 is shared by the pair of the second spaces S2 and opens at one of the two surfaces of the resonator 1F. As shown in FIGS. 17 and 18, the resonator 1F has a lower plate 16, an upper plate 17F, sidewalls 18F, and partitions 19F. The lower plate 16 and the upper plate 17F are arranged parallel to each other. The upper plate 17F is provided with one opening O2 that is shared by the pair of the second spaces S2. The sidewalls 18F are substantially the same as the sidewalls 18 of the previous embodiment, with the exception that one pair of the openings O1 is provided. The partitions 19F are substantially the same as the partitions 19 of the previous embodiment, with the exception that two partitions separating the pair of the second spaces S2 are excluded. According to the resonator 1F, the same effects as those attained by the resonator 1B of the previous embodiment can be attained. Furthermore, an advantage is obtained in that exclusion of the two partitions facilitates ease of manufacture of the resonator 1F.

In the above embodiments or modifications, the hollow body is described as a structure consisting of a wheel and a tire, but the hollow body is not limited thereto. The resonant sound reducing body can be used in various types of hollow bodies with annular spaces in which an air column resonance is to be reduced. Further, the first space, rather than being formed as a ring, may be annular portions.

The following aspects are derivable from the above described embodiments and modifications.

A hollow structure according to an aspect of the present disclosure has a hollow body with an annular first space; and at least one resonator in which there is formed an elongated second space, with a pair of openings at two ends thereof, each of the pair of openings comprising an opening that opens inwardly toward an interior of the first space. The ratio of a length of a centerline of the second space to a length of a centerline of the first space is within a range of from 0.45 to 0.55, and the second space is disposed in a curve along a circumferential surface of the first space and is shaped such that one of the two ends of the second space is folded back toward the other end. According to the above aspect, it is possible to reduce an air column resonance of a fundamental frequency and high-order frequencies generated in the first space since at least one resonator is used in which there is formed an elongated second space with a pair of openings at two ends thereof, with the openings being located within the first space. The effect of reducing an air column resonance can be achieved with the ratio of the length of the centerline of the second space to the length of the centerline of the first space being within a range of from 0.45 to 0.55. An advantage is obtained in that since the resonant frequency of the second space in the resonator is determined by the length of the centerline in the second space, the resonant frequency of the resonator is unlikely to change even if the resonator is deformed by centrifugal forces or the like, and thus the above described effect can be maintained.

In an example, the at least one resonator comprises a plurality of resonators, and in each of the plurality of resonators there is formed the second space. According to the above aspect, the effect of reducing an air column resonance of the first space can be increased as compared to the case of a single resonator.

In another example, the plurality of resonators are disposed at different positions in a circumferential direction of the first space. According to the above aspect, even if the direction of the excitation relative to the hollow body changes, a variation in air column resonance reduction effect in the first space can be easily reduced.

In another example, the plurality of resonators comprise four or more resonators. According to the above aspect, even if the direction of excitation relative to the hollow body changes, the variation in air column resonance reduction effect in the first space can be easily reduced.

In another example, the hollow structure further includes an air-permeable porous body, which is disposed at the each of the pair of the openings. According to this aspect, it is possible to adjust the air column resonance reduction effect in the first space. By appropriately setting the air permeability of the porous body, the reduction effect of an air column resonance can be enhanced as compared with a case in which no porous body is used.

In another example, the porous body comprises a nonwoven fabric. According to this aspect, it is possible to readily manufacture the porous body by use of a suitable available nonwoven fabric.

In another example, the porous body comprises a member that has a plate-shaped portion in which there is formed a plurality of through-holes. According to the above aspect, even if dirt and the like adhere to the porous body with use, an advantage is obtained in that the air permeability of the porous body is hardly reduced.

In another example, a lateral cross-sectional area of the second part is within a range of from 25 mm$^2$ to 1200 mm$^2$. According to the above aspect, for example, when the hollow structure is an assembly of an automotive vehicle tire and a wheel, or a structure having a first space of the same size, it is easy to achieve both the effect of reducing an air column resonance in the first space and ready installation of the resonator in the first space.

In another example, a shape of a lateral cross section of the second part is a quadrangle. According to the above aspect, an advantage is obtained in which the lateral cross-sectional area of the second space can be easily increased.

In another example, each of the at least one resonator is tube-shaped. According to the above aspect, the resonator can be easily manufactured using a suitable existing tube body.

In another example, an outer shape of each of the at least one resonator is plate-shaped. According to the above aspect, when the resonator is separately formed from the hollow body, an advantage is obtained in that the resonator can be easily installed in the hollow body.

In another example, the pair of openings are displaced from each other at an angle in a range of from 80 to 100 degrees along a circumferential direction of the first space. According to the above aspect, the effect is enhanced as compared with a case in which the pair of openings are arranged in any other arrangement.

A resonant sound reducing body according to another aspect of the present disclosure is a resonant sound reducing body that is disposed in a hollow body in which there is formed an annular first space, the resonant sound reducing body comprising an elongated second space with a pair of openings at two ends thereof. The ratio of a distance between the pair of openings to a length of a centerline of the second space is within a range of from 0.45 to 0.55, and the second space is disposed in a curve along a circumferential surface of the first space and is shaped such that one of the two ends of the second space is folded back toward the other end. According to the above aspect, the effect of reducing an air column resonance in the first space can be achieved when the ratio of the length of the centerline of the second space to the length of the centerline of the first space is within a range of from 0.45 to 0.55. Since the ratio of the distance between the pair of the openings to the length of the centerline of the second space is within a range of from 0.45 to 0.55, the pair of the openings can be displaced from each other at an angle within a range of from 80 to 100 degrees (inclusive) in the circumferential direction of the first space by configuring the ratio of the length of the centerline of the second space to the length of the centerline of the first space to be within the above range. Therefore, the effect of reducing an air column resonance is higher as compared with a case in which the pair of the openings are arranged in a different manner. An advantage is obtained in that, since the resonant frequency of the second space in the resonator is determined by the length of the centerline in the second space, even if the resonator is deformed by centrifugal forces or the like, the resonant frequency of the resonator is unlikely to change, and the effect of reducing an air column resonance in the first space is easily maintained.

Brief Description of Reference Signs

1 . . . resonator, 1A . . . resonator, 1B . . . resonator, 1D . . . resonator, 1E . . . resonator, 10 . . . hollow structure, 10D . . . hollow structure, 10E . . . hollow structure, 14 . . . porous body, 15 . . . porous body, 20 . . . wheel, 20D . . . wheel, 30 . . . tire, 30E . . . tire, 31 . . . bead part, 32 . . . tread part, 33 . . . sidewall part, 40 . . . hollow body, 40D . . . hollow body, 40E . . . hollow body, O1 . . . opening, O2 . . . opening, S1 . . . first space, S2 . . . second space.

What is claimed is:

1. A hollow structure comprising:
   a hollow body with an annular first space; and
   at least one resonator in which there is formed an elongated second space with a pair of openings at two ends thereof, each of the pair of openings comprising an opening that opens inwardly toward an interior of the first space, wherein:
- a ratio of a length of a centerline of the second space to a length of a centerline of the first space is within a range of from 0.45 to 0.55, and
- the second space is disposed in a curve along a circumferential surface of the first space and is shaped such that one of the two ends of the second space is folded back toward the other end.

2. The hollow structure according to claim 1, wherein the at least one resonator comprises a plurality of resonators, and in each of the plurality of resonators there is formed the second space.

3. The hollow structure according to claim 2, wherein the plurality of resonators are disposed at different positions in a circumferential direction of the first space.

4. The hollow structure according to claim 2, wherein the plurality of resonators comprise four or more resonators.

5. The hollow structure according to claim 1, further comprising: an air-permeable porous body, which is disposed at the each of the pair of the openings.

6. The hollow structure according to claim 5, wherein the porous body comprises a nonwoven fabric.

7. The hollow structure according to claim 5, wherein the porous body comprises a member that has a plate-shaped portion in which there is formed a plurality of through-holes.

8. The hollow structure according to claim 1, wherein a lateral cross-sectional area of the second part is within a range of from 25 $mm^2$ to 1200 $mm^2$.

9. The hollow structure according to claim 1, wherein a shape of a lateral cross section of the second part is a quadrangle.

10. The hollow structure according to claim 1, wherein each of the at least one resonator is tube-shaped.

11. The hollow structure according to claim 1, wherein an outer shape of each of the at least one resonator is plate-shaped.

12. The hollow structure according to claim 1, wherein the pair of openings are displaced from each other at an angle in a range of from 80 to 100 degrees along a circumferential direction of the first space.

13. A resonant sound reducing body that is disposed in a hollow body in which there is formed an annular first space, the resonant sound reducing body comprising:
- an elongated second space with a pair of openings at two ends thereof, wherein:
- a ratio of a distance between the pair of openings to a length of a centerline of the second space is within a range of from 0.45 to 0.55, and
- the second space is disposed in a curve along a circumferential surface of the first space and is shaped such that one of the two ends of the second space is folded back toward the other end.

* * * * *